(12) United States Patent
Head et al.

(10) Patent No.: US 8,433,802 B2
(45) Date of Patent: Apr. 30, 2013

(54) SYSTEM AND METHOD FOR FAIR AND ECONOMICAL RESOURCE PARTITIONING USING VIRTUAL HYPERVISOR

(75) Inventors: Michael R. Head, Vestal, NY (US);
Andrzej Kochut, Hawthorne, NY (US);
Charles O. Schulz, Hawthorne, NY (US); Hidayatullah H. Shaikh, Hawthorne, NY (US)

(73) Assignee: International Business Machines Corporation, Armonk, NY (US)

(*) Notice: Subject to any disclaimer, the term of this patent is extended or adjusted under 35 U.S.C. 154(b) by 293 days.

(21) Appl. No.: 12/693,967

(22) Filed: Jan. 26, 2010

(65) Prior Publication Data
US 2011/0185064 A1   Jul. 28, 2011

(51) Int. Cl.
*G06F 15/173* (2006.01)
*G06F 9/455* (2006.01)

(52) U.S. Cl.
USPC .............................. 709/226; 709/223; 718/1

(58) Field of Classification Search .................. 709/219, 709/226, 223; 718/1
See application file for complete search history.

(56) References Cited

U.S. PATENT DOCUMENTS

| 2005/0262504 | A1* | 11/2005 | Esfahany et al. | 718/1 |
| 2008/0222638 | A1* | 9/2008 | Beaty et al. | 718/100 |
| 2010/0211946 | A1* | 8/2010 | Elzur | 718/1 |
| 2010/0223613 | A1* | 9/2010 | Schneider | 718/1 |

OTHER PUBLICATIONS

Bobroff, et al. "Dynamic Placement of Virtual Machines for Managing SLA Violations," 10th IFIP/IEEE International Symposium on Integrated Network Management, 2007. IM '07., May 2007.
Clark, et al. "Live Migration of Virtual Machines," in Proceedings of the Symposium on Networked Systems Design and Implementation, May 2005. (14 Pages).
Creasy, "The Origin of the VM/370 Time-Sharing System," IBM Journal of Research and Development, vol. 25, No. 5. Sep. 1981. pp. 483-490.
Gum, "System/370 Extended Architecture: Facilities for Virtual Machines," IBM Journal of Research and Development, vol. 27, No. 6. Nov. 1983.

(Continued)

*Primary Examiner* — Yves Dalencourt
*Assistant Examiner* — Hee Soo Kim
(74) *Attorney, Agent, or Firm* — Tutunjian & Bitetto, P.C.; Louis Percello

(57) ABSTRACT

A system and method for allocating resources in a cloud environment includes determining permitted usage of virtual machines and partitioning resources between network servers in accordance with a virtual hypervisor generated in accordance with an abstraction layer configured as an interface between a solution manager and an interface to a cloud network. Resource usage limits are determined for each virtual machine associated with the virtual hypervisor, and the servers are analyzed through the virtual hypervisors to determine if the virtual machines need to be migrated. If reallocation is needed, virtual machine migration requests are issued to migrate virtual machines into a new configuration at the virtual hypervisor abstraction level. The servers are reanalyzed to determine if migration of the new configuration is needed. Shares are computed to enforce balance requirements, and virtual machine shares and limits are adjusted for resources according to the computed shares.

25 Claims, 3 Drawing Sheets

OTHER PUBLICATIONS

Barham, et al. "XEN 2002," University of Cambridge, Computer Laboratory, Tech. Rep. No. 553. Jan. 2003. pp. 1-15. http://www.cl.cam.ac.uk/TechReports/ UCAM-CL-TR-553.pdf.

Barham, et al. "XEN and the Art of Virtualization," in Proceedings of OSDI, Oct. 2003. (14 Pages).

IBM, "Advanced Power Virtualization on IBM System P5," Fourth Edition. May 2008. (400 Pages) http://www.redbooks.ibm.com/abstracts/sg247940.html.

Kimbrel, et al. "Dynamic Application Placement Under Service and Memory Constraints," in Proceedings of International Workshop on Efficient and Experimental Algorithms, Apr. 2005. pp. 1-10.

Kimbrel, et al. "Minimizing Migrations in Fair Multiprocessor Scheduling of Persistent Tasks," in Proceedings of ACMSIAM Symp. on Discrete Algorithms, Jul. 2004.

Kochut, "On Impact of Dynamic Virtual Machine Reallocation on Data Center Efficiency," in Proceedings of the IEEE MASCOTS. IEEE International Symposium on Modeling, Analysis and Simulation of Computers and Telecommunication Systems, 2008. MASCOTS 2008. Sep. 2008.

Kochut, et al. "On Strategies for Dynamic Resource Management in Virtualized Server Environments," in Proceedings of the IEEE MASCOTS. 15th International Symposium on Modeling, Analysis, and Simulation of Computer and Telecommunication Systems. Oct. 2007.

Rolia, et al. "Statistical Service Assurances for Applications in Utility Grid Environments," Performance Evaluation Journal, vol. 58, 2004. (10 Pages).

Shen, et al. "Integrated Resource Management for Cluster-Based Internet Services," in Proceedings of the OSDI, 2002. (14 Pages).

Sugerman, et al. "Virtualizing I/O Devices on VMware Workstation's Hosted Virtual Machine Monitor," Proceedings of the 2001 USENIX Annual Technical Conference, Jun. 2001. (15 Pages).

Waldspurger, "Memory Resource Management in VMware ESX Server," In Proc. Fifth Symposium on Operating Systems Design and Implementation (OSDI '02), Dec. 2002. pp. 1-14.

\* cited by examiner

SYSTEM AND METHOD FOR FAIR AND ECONOMICAL RESOURCE PARTITIONING USING VIRTUAL HYPERVISOR

BACKGROUND

1. Technical Field

The present invention relates to computer networks and more particularly to systems and methods for resource allocation in cloud environments.

2. Description of the Related Art

Virtualization has rapidly gained popularity, which affects multiple levels of computing stacks. Since virtualization decouples resources from their users it provides greater flexibility in terms of resource allocation but also brings in new challenges for optimal design, provisioning and runtime management of systems. Cloud computing is a paradigm of computing that offers virtualized resources "as a service" over the Internet. Cloud Managers are responsible for lifecycle management of virtual resources, for efficient utilization of physical resources, and for exposing basic application programming interfaces (APIs) for operations to users. Software solutions can then be deployed on these virtual resources.

Virtualization, which decouples physical resources from their users, has emerged as one of the key drivers of data center innovation and optimization. Operating system virtualization was first proposed by IBM in the 1960's. Recently, with increased computing capacity of the low-end machines, similar capabilities are now available for many platforms. A virtualized server runs a thin software or firmware layer called a hypervisor which presents an abstraction of the underlying hardware to host multiple virtual machines (VMs). VMs execute either an unmodified (in case of full virtualization) or a slightly modified (in case of para-virtualization) version of the operating system. Virtualization increases server utilization and therefore increases data center efficiency by combining several workloads on a single server.

Referring to FIG. 1A, a typical solution built on virtualized servers is shown. A Solution Manager 12 deploys VMs 14 and manages them based on problem space specific knowledge and runtime information including current workload, calendar, wall clock time, and historical workload models. To perform these management functions, the manager 12 interacts with a hypervisor manager 16 on individual servers 18 or with a central virtualization infrastructure manager such a VMware's vCenter™. The virtualization manager 16 allows the solution manager 12 to monitor resource usage 20 on each of the servers 18 (and by each of the VMs 14) as well as to make configuration changes such as adding, removing, starting, stopping VMs 14. Manager 16 can also control the placement of VMs 14 on physical servers 18 and the relative shares of resources that are allocated to each of the VMs 14 during the periods of contention. The solution manager 12 manipulates these controls to optimize performance and resource utilization.

The latest development in the virtualization trend is known as cloud computing where the management of applications and groups of applications is separated from the management of the underlying physical resources (such as servers, networks, storage, etc.). The promise of cloud computing is to aggregate very large numbers of applications and services and achieve unprecedented levels of efficiency in server utilization and administration.

Referring to FIG. 1B, a basic cloud model is depicted. The cloud 32 provides virtual machines 34 and an application programming interface (API) 36. The API 36 supports the creation and destruction of VMs 34 plus a few basic controls of these VMs such as "Power On", "Power Off", "Reset", etc. The cloud API 36 provides a very opaque interface to the virtualized environment. The cloud 32 is managed by a cloud manager 40, which assumes all responsibility for allocation of resources, placement of the VMs, and workload management of physical servers 38. For example, an enterprise can deploy a web server on a cloud without ever having to consider how many and what type hardware is used to support its computing needs. The enterprise, the cloud customer, is only concerned with specifying to the cloud provider how many virtual machines it needs and their resource requirements. The cloud provider is solely responsible for deploying the VM and managing the physical hardware, and the enterprise (or solution deployer) is responsible only for the solution software which runs within the VM 34. This separation of responsibility is further enforced by the common cloud APIs which hide from the enterprise most details of the underlying platform and hide from the cloud provider all (or most) details of the solutions running in the deployed VMs 34.

This model works well for solutions that do not require or benefit from explicit control over the resource allocation decisions. However, it presents a very challenging environment for optimizing the overall computing environment both from the perspective of the cloud provider and the solution manager. Solutions often use application specific intelligence and information to make optimization decisions for best resource utilization and service responsiveness. For example, a virtual desktop solution will make use of the calendar, usage histories, and user specific information such as "Joe is traveling to India this week" to optimize the user experience and resource usage. In the example of Joe traveling to Asia, the virtual desktop solution may decide to move Joe's virtual machine to a hosting center in Asia for the duration of his travel. It is tempting to merge the solution space optimization with the cloud as this can provide globally optimal workload management. However, incorporating solution space intelligence for every possible solution in the cloud management layer is a monumental task, and it is not obvious that all solution providers will be willing to divulge this knowledge to the cloud provider.

In essence, layering a virtualization aware solution such as in FIG. 1A on top of the cloud infrastructure such as in FIG. 1B requires compromises on the part of the solution, or the cloud, or both. Either the solution must give up its problem space specific workload management and rely on the cloud based physical resource management or the cloud must incorporate solution space knowledge and information in its management decisions. For the reasons stated above, both of these options are problematic.

SUMMARY

A virtual hypervisor provides a new cloud manager API for improved control over the resource allocation decisions, and a method ensures performance isolation among virtual hypervisors by adjusting shares and limits for all tracked resources are disclosed.

A system and method for allocating resources in a cloud environment includes determining permitted usage of virtual machines and partitioning resources between network servers in accordance with a virtual hypervisor generated in accordance with an abstraction layer configured as an interface between a solution manager and an interface to a cloud network.

Another system and method for allocating resources in a cloud environment includes determining permitted usage of virtual machines and partitioning resources between network servers in accordance with a virtual hypervisor generated in accordance with an abstraction layer configured as an interface between a solution manager and an interface to a cloud network. Resource usage limits are determined for each virtual machine associated with the virtual hypervisor, and the servers are analyzed through the virtual hypervisors to determine if the virtual machines need to be migrated. If reallocation is needed, virtual machine migration requests are issued to migrate virtual machines into a new configuration at the virtual hypervisor abstraction level. The servers are reanalyzed to determine if migration of the new configuration is needed. Shares are computed to enforce balance requirements, and virtual machine shares and limits are adjusted for resources according to the computed shares.

A system for allocating resources in a cloud environment includes a solution manager configured to deploy and manage virtual machines, and a cloud network managed by a cloud manager and including at least one physical server configured to employ the virtual machines. At least one virtual hypervisor includes abstract groupings of resources which are managed by the cloud manager with respect to a service level agreement between the cloud manager of the cloud network and the solution manager, wherein the cloud manager maps the virtual machines to the at least one physical server in accordance with constraints defined by the at least one virtual hypervisor and the virtual machines handled by the solution manager are abstracted on top of the at least one virtual hypervisor such that resources are efficiently and fairly allocated within the cloud network.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1A:
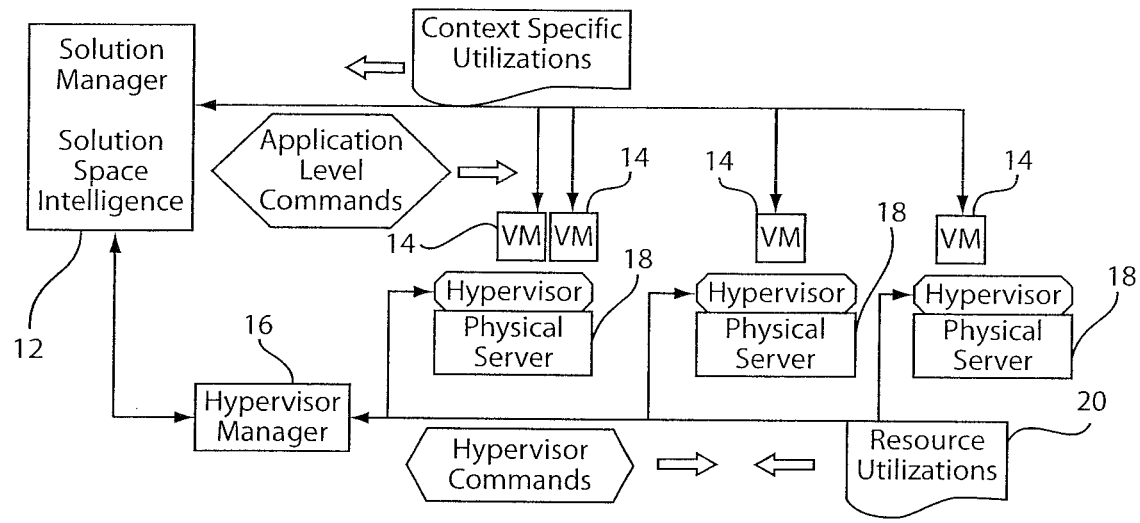
FIG. 1A is a block diagram showing an allocation solution constructed on virtualized servers in accordance with the prior art.
Figure 1B:
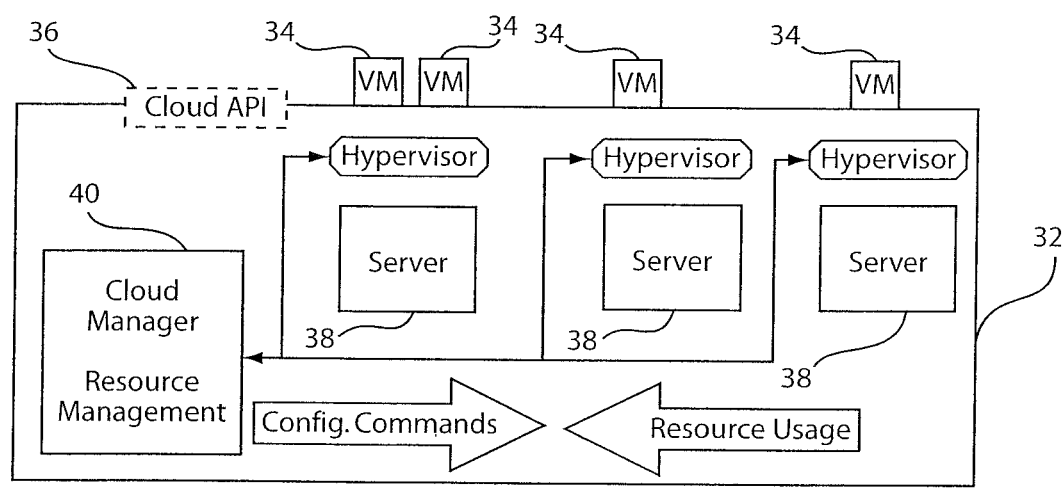
FIG. 1B is a block diagram showing a basic cloud system in accordance with the prior art.

In accordance with the present principles, a virtual hypervisor abstraction is provided which permits solution managers to have improved control over resource allocation decisions regarding their virtual machines while maintaining a cloud manager's role as the ultimate physical resource manager. In addition, methods are provided for resource allocation illustrating how the virtual hypervisor abstraction can be efficiently realized by a global cloud manager. Simulations have been employed to prove that the present concepts can be used to achieve fairer resource sharing and isolation across different virtual hypervisors.

In accordance with particularly useful embodiments, the cloud model is enhanced to empower solution managers to have much better control over the resource allocation decisions regarding virtual machines (VMs). A partition of the management of the cloud physical infrastructure is maintained from the management of the solutions hosted on the cloud. With this partitioning the solution managers can concentrate on optimizing their well known environments (their domain within the cloud), and cloud management can focus on making the most efficient use of the physical resources and making sure that it fulfills Service Level Agreements (SLAs) with its customers.

To achieve this separation, a concept of a virtual hypervisor (VH) is introduced which interacts with the solutions in a manner similar to a real hypervisor and provides an abstraction permitting the solution to decide how the underlying resources should be shared and how the resource contention should be resolved. The cloud manager can map virtual machines to physical servers in the most optimal fashion (from its point of view) as long as it meets the constraints defined by the virtual hypervisor. The virtualization aware solution requests virtual hypervisors from the cloud instead of specific VMs. It then uses these virtual hypervisors just as it would use actual hypervisors on the physical hosts interfacing with them using an API similar to that used with actual physical servers and a virtualization manager. These virtual hypervisors are not real entities. They are simply abstract groupings of resources which are managed by the cloud with respect to a single service level agreement between the cloud manager and the solution manager. The actual mapping of the virtual hypervisor on to physical servers is the responsibility of the cloud manager, and the deployment and management of VMs on top of the virtual hypervisors is handled by the solution manager.

In a virtual desktop, the solution manager first requests some number of virtual hypervisors providing specific requirements, such as geography where they should execute (or network distance from a given location, which affects the remote desktop experience), capacity that should be available, as well as other parameters, such as network bandwidth between VMs created within this virtual hypervisor, and storage requirements. Subsequent to this, a solution manager creates virtual machines within the virtual hypervisors and assigns capacity limits, resource usage shares, and other properties similarly to virtualization models. During system operation, the solution manager can adjust the shares of its virtual machines within the virtual hypervisor, or migrate VM from one virtual hypervisor to another. Those actions have an explicit effect on resource allocation and user experience. For example, if a desktop solution manager knows that certain desktops are performing less important work, it can migrate a larger number of them to a single virtual hypervisor while moving more important VMs to a less congested virtual hypervisor. Note that this migration does not necessarily result in actual VM migration at the infrastructure level. It is up to cloud manager to decide how to realize the isolation and resource allocation specified by virtual hypervisors. Similar expressiveness could be achieved by complex language on a set of VMs in the cloud model.

A virtual hypervisor abstraction permits solution managers to have improved control over the resource allocation decisions regarding their virtual machines while maintaining a cloud manager's role as the ultimate physical resource manager. Resource allocation methods illustrate how the virtual hypervisor abstraction can be efficiently realized by the global cloud manager.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
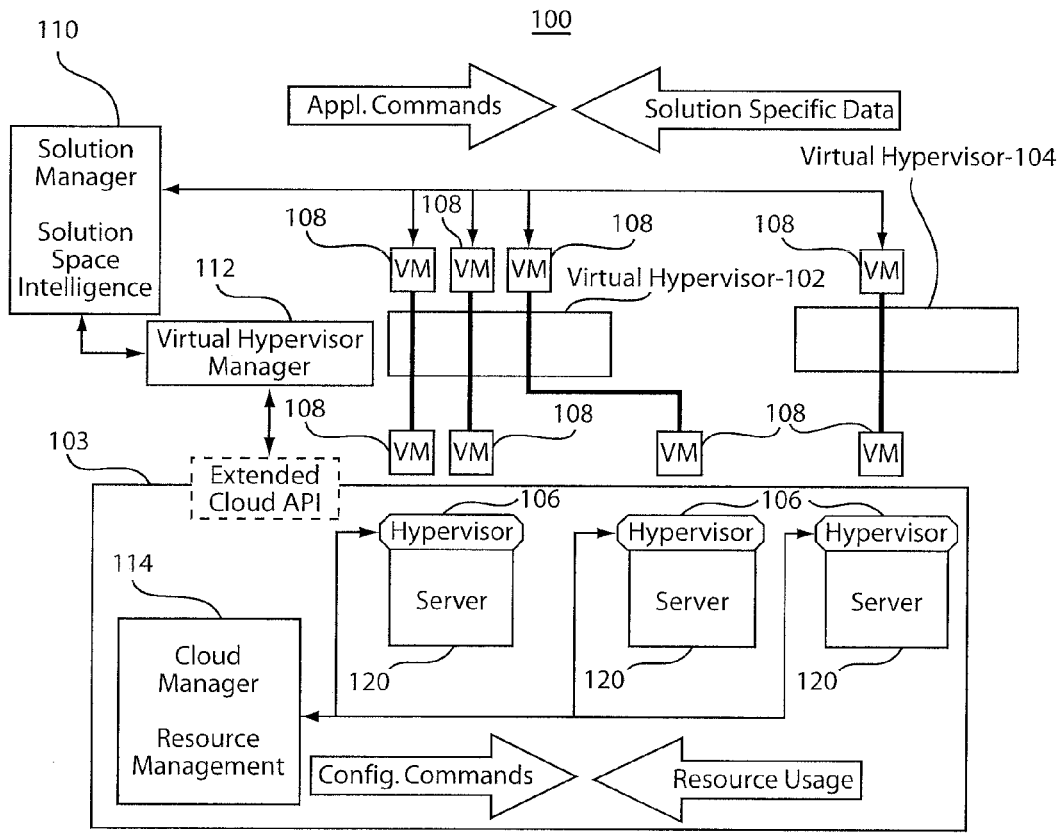
FIG. 2 is a block/flow diagram showing a system/method for fair and economical resource partitioning using a virtual hypervisor in accordance with the present principles.

Referring now to the drawings in which like numerals represent the same or similar elements and initially to FIG. 2, a system 100 is illustratively depicted showing the use of a virtual hypervisor abstraction in accordance with the present principles. A virtual hypervisor 102, 104 provides a cloud application developer of a cloud network 103 with application program interfaces (APIs) of physical hypervisors 106, without exposing the details of particular hypervisor software or upon which physical host (e.g., servers 120) the hypervisor runs. This permits cloud application developers to plan for, and make use of the fact that the performance characteristics of their solutions will be affected by the placement of their virtual machines (VMs) 108 in a data center. At the same time, by hiding the implementation details of the virtual hypervisor 102, 104, cloud service providers continue to have a great deal of freedom to implement the abstraction at a low cost with efficient resource allocation algorithms.

A local solution manager 110, a solution manager API 112, and a global cloud manager 114 are provided. The solution manager API 112 is an interface for the virtual hypervisor (virtual hypervisor manager). The solution manager 110 calls into the system 100 (after authenticating) to getVirtualHypervisor (characteristics) which answers a handle to a virtual hypervisor (vh). The characteristics parameter, called H, can be a statement about a variety of resources: CPU, memory, and network latency and bandwidth. Network characteristics can apply internally or externally. In the internal case, H specifies the network performance between nodes created by the virtual hypervisor. In the external case, H refers to connectivity to an external point—for example, the ping time to the Wall Street trading floor. For illustrative purposes, we focus on CPU and memory requirements; however the methods are applicable to many resource types.

In the context of a solution, the manager 110 may define shared resources that are available to all virtual hypervisors allocated to the solution. The two primary resources of interest may be, e.g., virtual local area networks (VLANs) and storage. A VLAN represents a private network within a data center that facilitates private communication between virtual machines attached to the VLANs. Likewise, the shared storage provides a shared file system available to store VM images that facilitate migration as well as cloning new VM instances from common sources throughout the solution.

The solution manager's 110 primary responsibility is to create virtual machines 108 for Service Level Agreements (SLAs) with associated prices. The solution manager 110 provides application commands and receives solution specific data. A virtual machine, vm, is created using a call to createVirtualMachine (vh, SLAs). Only virtual machines created inside the solution have access to the shared resources. We define SLAs in the context of CPU and memory requirements. In these contexts, the user specifies a tuple (C, Res, L, $\delta$), where C is the resource class, CPU or memory, Res is the baseline resource reservation of that that the cloud provider guarantees at all times, L is the peak limit that the cloud provider will provide on demand, and $\delta$ is the minimum rate at which the cloud provider guarantees capacity can be increased beyond the baseline. The relationships between these constraints are illustratively portrayed in FIG. 3.

Figure 3:
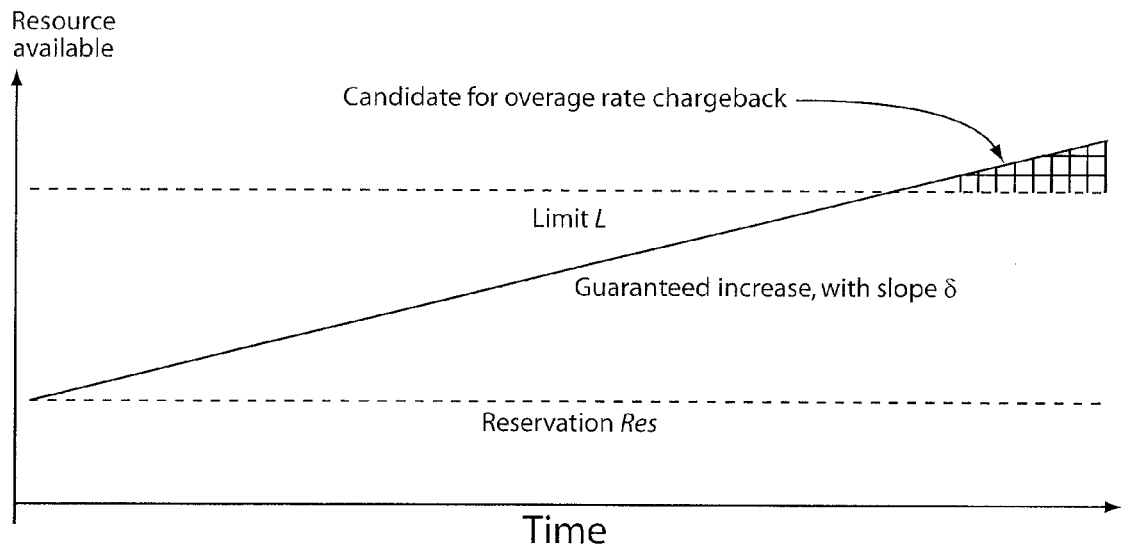
FIG. 3 is a diagram showing a service level contract definition of a virtual machine in accordance with an illustrative embodiment.

Referring to FIG. 3 with continued reference to FIG. 2, as the value of each constraint is increased, the service price increases. Under this model, resource usage under Res would be included in the subscription price and resource usage between Res and L would be metered and charged back at a discount rate. Resource usage above L may or may not be provided and could be a candidate for an overage-rate price for solutions that choose the option. Note that while the following inequalities must hold, $$\sum_{vm \in vh} Res_{vm} \leq H_{vh}$$

and $\max(L_{vm \in vh}) \leq H_{vh}$; this inequality, $$\sum_{vm \in vh} L_{vm} \leq H_{vh},$$

need not hold. In other words while, for any given resource, the sum of reservations of virtual machines in a virtual hypervisor is to be less than the specified capacity of the virtual hypervisor, and the greatest limit specified by a VM in a VH is to be less than the capacity of the VH, it is explicitly not the case that sum of the limits be less than the capacity. This allows the solution manager 110 to overcommit the virtual hypervisor 102, 104.

In addition to setting these characteristics in the initial request, the solution manager API 112 supports a form of dynamic reallocation with a call with a signature of re-characterize (vm, SLAs). This allows the solution manager 110 to respond to dynamic conditions in the operation of the service. For example, it may be important that during business hours a particular set of virtual machines be highly available, with the associated cost being acceptable. After hours, however, this additional cost need not be borne by the customer, so the solution manager 110 would re-characterize the hypervisor at an appointed time, after the last user signs out at night, or based on some other dynamic event. The solution manager 110 also has access to the standard range of monitoring features exposed by concrete hypervisors. This allows the manager 110 to re-characterize SLAs based not only on local knowledge but also based on real time usage data. Full access to current metering information gives the solution manager 110 the opportunity to become a powerful feedback controller, dynamically trading between performance and cost based on private (to the solution manager 110) business decisions.

The API 112 permits the solution manager 110 to request the cloud manager 114 to free the virtual hypervisor's (102, 104) resources: releaseVirtualMachine (vh, vm) and releaseVirtualHypervisor (vh). After invoking these calls, the solution manager 110 no longer has access to, respectively, the given virtual machine 108 or virtual hypervisor 102, 104.

The global cloud manager 114 implements the solution manager API 112 in the best way it sees fit. Given these service quality requirements, it can better plan for consolidation and capacity reduction. The cloud manager 110 provides configuration commands and receives resource usage information. Virtual machines 108 with high $\delta$s will cost more, but have capacity pre-allocated to meet those high guarantees. Given appropriate planning, virtual machines 108 with low $\delta$s can be consolidated and migrated as needed as load demand rises. The guaranteed load increase rate, $\delta$, is guaranteed over a time range, specifically, a period of $$\frac{L - Res}{\delta}$$

seconds. At a given time t, load samples $l_1 \ldots l_N$ are collected at N time points $t_1 \ldots t_N$ between $$\frac{t - L - Res}{\delta}$$

and t. Unless the client load increases at exactly a rate of $\delta$, there will be multiple points which could be chosen as the current load entitlement value at time t.

We choose the currentEntitlement$_t^r$ on resource r at time $t_N$ according to the following formula (with $i \in [1, N]$):

$$\text{currentEntitlement}_t^r = \min(\max(Res, l_i) + \delta(t - t_i)) \qquad (1).$$

The $\delta$ increase is guaranteed only from $1_N^e$, not from $1_N$. This prevents a VM from rapidly increasing its load rapidly to obtaining a higher SLA guarantee than was agreed on when it was created. The methods implementing these guarantees are described hereinafter.

The solution manager 110 is provided by the cloud application developer. The solution manager 110 has special knowledge about the static requirements of the deployed service and may be informed by dynamic internal application usage. With this local knowledge, the solution manager 110 can effectively make dynamic decisions about service level agreement, high availability, and pooling requirements in a fine grained manner.

Example Solution: Desktop Cloud Service. A desktop cloud service is a cloud service that provides desktop instances which users access via graphical terminal software. The service has the responsibility of managing desktop images, mapping users to desktop instances, and brokering connections between users' machines and their respective desktops' virtual machines in the data center. Providing this service in a scalable manner can be a challenge. Implementing this service in a manner that allows for trusted multi-tenancy and quality of service guarantees with the current cloud model—that simply provides the ability to create, use and destroy virtual machines—is a significant challenge.

Such a service needs a number of management nodes that coordinate the desktop service and provide an administrative interface which a desktop service provider would need to monitor and manage the service. Management nodes, which control the actual creation and mapping of end user desktop virtual machines would also be assigned for each tenant.

The service provider's management nodes should be connected to the service provider's intranet, but not to any tenant's intranet. Likewise, each tenant's nodes should be connected to its respective tenant's intranet, but not to that of the service provider. All the management nodes, however, will need to communicate via their own private backbone network. Providing these networks and virtual machines that are multi-homed is not feasible without a mechanism for specifying virtual LANs across the solution.

The performance of some virtual machines in the solution may have a greater impact on the overall service quality than others. Simple prioritization schemes may help, but without strong SLAs with the cloud provider, a service provider would be unable to provide guaranteed, service-oriented quality to its customers. For example, a desktop service customer may wish to pay a premium so some users never need to wait for their desktops to be available, while for a lower price other users can tolerate some wait time when launching applications. Further, the facility for the solution manager to re-characterize the SLAs allows it to turn down the availability after the end of business. Furthermore, it can do this based on the time zone of the user.

RESOURCE ALLOCATION METHOD FOR GLOBAL CLOUD MANAGER: One of the aspects of the present system is the allocation employed by the cloud provider. The method should provide automated allocation of virtual machines 108 created within logical virtual hosts to actual physical servers 120 running virtualization software. Virtual machine allocation decisions made by the method have primary impact on both quality of service perceived by deployed solutions as well as on the efficiency and cost effectiveness from the service provider's point of view.

The allocation problem can be defined as an on-line decision process guiding the assignment of virtual machines to servers as well as the adjustment of appropriate parameters, such as resource limits and shares. Each decision takes into account not only functional requirements (such as in which geography a virtual host should be deployed, which specific features are needed of the host server, etc.) but also has to enforce resource isolation between virtual hosts and virtual machine priorities within virtual hosts.

We focus on assuring performance isolation between virtual hypervisors and prioritization among virtual machines defined within a virtual hypervisor. The methods we present can be extended to account for functional requirements as well as other constraints by adding additional requirements while making virtual machine deployment and migration decisions. Our management method addresses topics related to controller time constants, lengths of the optimization horizon, as well as issues related to choice of size of physical server. The method provides performance isolation among virtual hypervisors. To optimize data center virtual machines belonging to a given virtual hypervisor, the VMs are not actually allocated to a dedicated physical server. Instead, they potentially share physical servers with other virtual hypervisors and therefore may be subjected to resource contention. Since resource demand of a particular virtual machine can vary greatly, the method ensures that the SLA guarantees are met. Therefore, the resource allocation method plans virtual machine reallocation actions as well as updates of resources and limits to provide the isolation.

TABLE I

Parameters provided by the service provider (related to server capacities) as well as virtual hypervisor and virtual machine characteristics (provided at creation or modification time).

| | |
|---|---|
| $C_i^r$ | capacity of physical server i for resource r |
| $H_i^r$ | capacity of virtual hypervisor i for resource r |
| $Res_i^r$ | reservation of VM i for resource r |
| $\delta_i^r$ | minimum guaranteed rate of growth of resource r for VM i |
| $L_i^r$ | maximum allowed usage of resource r by VM i |
| $Share_i^r$ | relative share of resource r for VM i within the virtual hypervisor |
| Step | controller interval |
| $\Delta t$ | optimization time horizon |

External parameters are described in TABLE I and include capacity of physical servers and virtual hypervisors, performance characteristics of virtual machines within the virtual hypervisor (resource reservations, maximum capacity usage, resource shares, and maximum rate of resource usage growth). Moreover, a management method control loop interval and optimization horizon are also provided.

Figure 4:
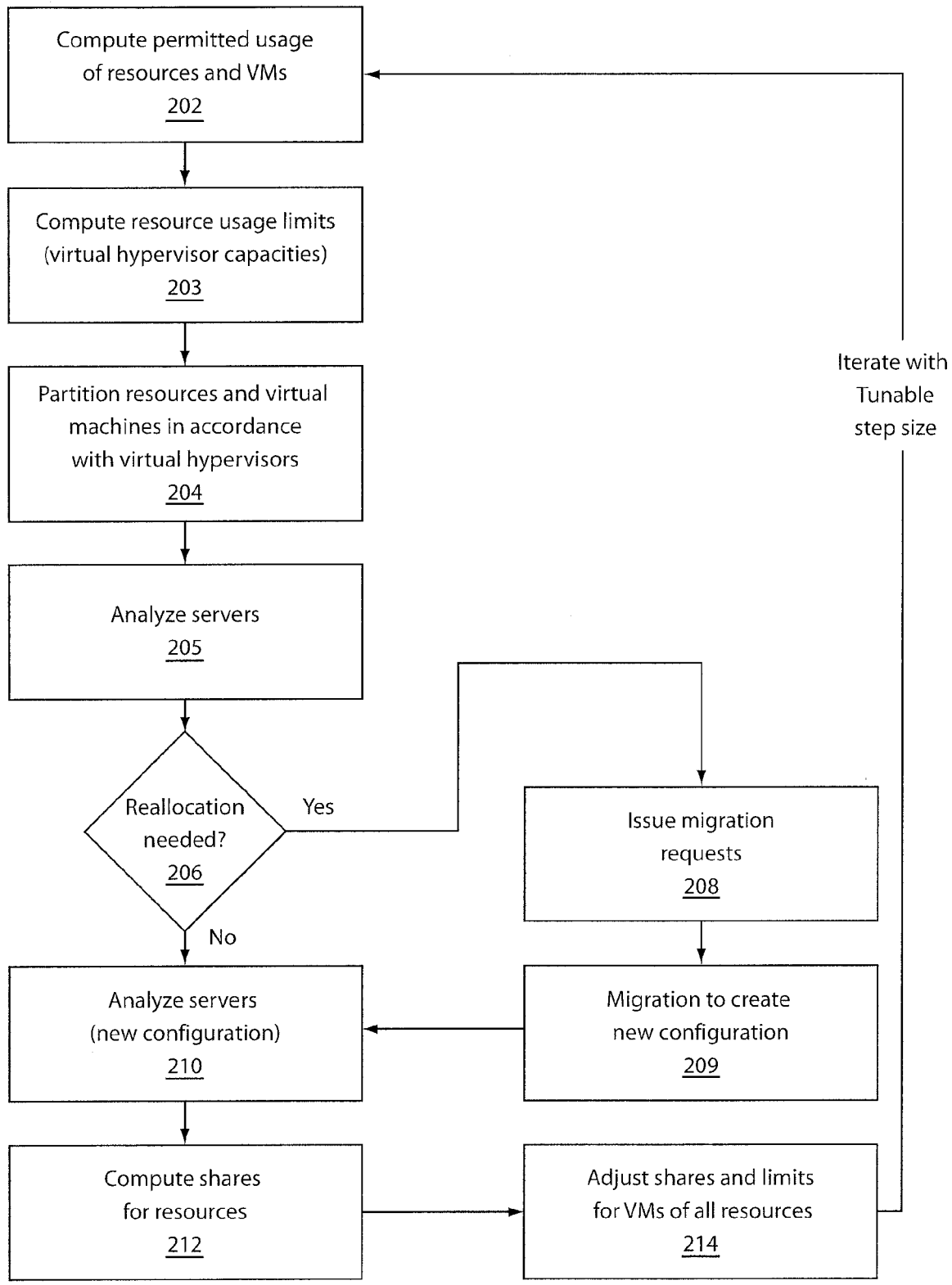
FIG. 4 is a block/flow diagram showing a management system/method for fair and economical resource partitioning using a virtual hypervisor in accordance with the present principles.

Referring to FIG. 4, a management method for managing resources in a computer environment is illustratively depicted. The method periodically executes analysis and resource adjustment with a tunable step size. During each iteration, the method first computes permitted usage of each of the virtual machines (based on the SLA describing resource usage limits, rates of growth, etc.) in block 202. Next, in the 203, the method computes resource usage limits (in case the virtual hypervisor reaches its capacity), and analyzes physical servers, in block 205, to determine if virtual machines need to be migrated to keep physical servers within operating utilization range.

The virtual hypervisors are requested from the cloud network. The virtual hypervisors include abstract groupings of resources which are managed by the cloud manager with respect to a service level agreement between a cloud manager of the cloud network and the solution manager. VM assignment and resource partitioning is determined in accordance with the virtual hypervisors initially in block 203. The deployment and management of the virtual machines on top of the virtual hypervisors is handled by the solution manager.

If the reallocation is needed (either because of having overloaded servers or too many underutilized servers allowing for consolidation) as determined in block 206, the method issues actual virtual machine migration requests to the underlying virtualization infrastructure in block 208. In block 209 a new configuration is created at the virtual hypervisor level. Otherwise, if no reallocation is needed, the method continues to block 210. Next, the method analyzes servers again to establish new load values (for post reallocation configuration) in block 210 and computes shares that should be set on the virtualization infrastructure to enforce virtual host parameters in block 212. The method adjusts virtual machine shares and limits for all tracked resources according to the computed values in block 214.

TABLE II presents variables used in the method. The pseudo-code of the management method is presented below.

TABLE II

VARIABLES USED IN THE MANAGEMENT METHOD.

| | |
|---|---|
| $l_i^r(t)$ | demand for resource r due to VM i at time t |
| allowedDemand$_i^r(t)$ | maximum allowed demand for VM i for resource r at t given prior history and SLA |
| minRes$_i^r(t)$ | minimum guaranteed amount of resource r to VM i at time t |
| VHLoad$_h^r(t)$ | total demand on VH h for resource r at t |
| surplus$_h^r(t)$ | capacity surplus on VH h for resource r at t |
| totGreedyShares$_h^r(t)$ | sum of shares for resource r of all "greedy" VMs on VH h at t |
| greedy$_h^r(t)$ | set of "greedy" VMs within VH h with respect to resource r at t |
| allowedLoad$_j^r(t)$ | allowed load for VM j against resource r at t |
| fairDem$_j^r(t)$ | fair demand share for VM j for resource r at t |
| demDelta$_j^r(t)$ | difference between fair and requested demand for VM j, resource r at t |
| limit$_j^r(t)$ | physical server level resource limit for VM j and resource r at t |
| totalServeLoad$_s^r(t)$ | total load on server s for resource r at t |
| totalLoad$_{h,s}^r(t)$ | total load on server s due to VMs from VH h for resource r at t |
| totalShares$_{h,s}^r(t)$ | total shares of VMs from VH h running on server s for resource r at t |
| util$_s^r(t)$ | utilization of resource r on server s at t |
| serverStatus$_s^r(t)$ | status of resource r of server s at t (possible values: OVER_COMMITTED, UNDER_COMMITTED, OK) |
| fairShare$_{h,s}^r(t)$ | fair share of resource r for VH h within server s at t |
| effectiveShare$_i^r(t)$ | effective share of resource r for VM i at t |

The management method will be presented in portions of pseudo-code. Table III shows pseudo-code of a main controller function. The parameter controllerStep is tunable as described above.

TABLE III

```
procedure MainAllocationFunction( )
    while(true) do
        ComputeAllowedUsage(t);
        ComputeLimits(t);
        AnalyzePhysicalServers(t);
        ReallocateVMs(t);
        AnalyzePhysicalServers(t);
        ComputeShares(t);
        EnforceLimitsAndShares(t);
        t = t + Step
    end while;
```

TABLE IV

Pseudo-code of allowed usage computation step executed at time t, using currentEntitlement$_i^r$ from Eq. (1).

```
procedure ComputeAllowedUsage(t)
    for each VM i and each resource r do
        allowedDemand_i^r(t + Δt) = currentEntitlement_i^r + δ_i^r(Δt)
        min Res_i^r(t) = max[Res_i^r(t), allowedDemand_i^r(t + Δt)] ;
        min Res_i^r(t) = min[min Res_i^r(t), L_i^r] ;
    end for ;
```

TABLE V

Pseudo-code for the limit computation step (as executed at time t).

```
procedure ComputerLimits(t)
    for each VH h and each resource r do
        VHLoad_h^r(t) = Σ_{j∈{VM on VHh}} l_j^r(t);
        if VHLoad_h^r(t) > H_h^r then
            surplus_h^r = 0;
            totGreedyShares_h^r = 0;
            greedy_h^r = { };
            for each VM j on VH h and each resource r do
                allowedLoad_j^r(t) = min[min Res_j^r(t), l_j^r(t)];
```

TABLE V-continued

Pseudo-code for the limit computation step (as executed at time t).

$$\text{fairDem}_j^r(t) = \frac{\text{Share}_j^r}{\Sigma_{k\in\{VMs\ in\ VH\ h\}}\text{Share}_k^r} H_h^r;$$

```
            demDelta_j^r(t) = fairDem_j^r(t) - allowedLoad_j^r(t);
            if demDelta_j^r(t) > 0 then
```

$$\text{surplus}_h^r\ += \frac{\text{demDelta}_j^r(t)}{2};$$

$$\text{limit}_j^r(t) = \text{demDelta}_j^r(t) + \frac{\text{demDelta}_j^r(t)}{2};$$

```
            else
                limit_j^r(t) = fairDem_j^r(t);
                totGreedyShares_h^r(t) = fairDem_j^r(t);
                greedy_h^r = greedy_h^r ∪ {j};
            end if;
        end for;
        for each resource r do
            for VM j ∈ greedy_h^r do
```

$$\text{limit}_j^r(t)\ += \text{surplus}_h^r \frac{\text{Share}_j^r}{\text{totGreedyShares}_h^r(t)};$$

```
            end for;
        end for;
    end if;
end for;
```

TABLE VI

Pseudo-code for the physical server assessment step (as executed at time t).

```
procedure AnalyzePhysicalServers(t)
for each physical server s and each resource r do
    totalServLoad_s^r(t) = 0;
    for each host h do
        for each VM i on VH h on server s do
            if i is limited then
                totalLoad_{h,s}^r(t) = limit_i^r(t);
            else
                totalLoad_{h,s}^r(t) = min Res_i^r(t);
            end if;
            totalShares_{s,h}^r(t)+ = Share_i^r;
        end for;
        if totalLoad_{h,s}^r(t) > H_h^r then
            totalLoad_{h,s}^r(t) = H_h^r;
        end if;
        totalServLoad_s^r(t)+ = totalLoad_{h,s}^r(t);
    end for;
    util_s(t) = totalServLoad_s^r(t) / C_s^r;
    if util_s^r(t) > HIGH_UTIL then
        serverStatus_s^r(t) < OVER_COMMITTED then
    else if util_s^r(t) < LOW_UTIL then
        serverStatus_s^r(t) < UNDER_COMMITTED;
    else
        serverStatus_s^r(t) = OK;
    end if;
end for;
```

TABLE VII

Pseudo-code for the VM reallocation step (as executed at time t) for when a move is beneficial.

```
procedure Reallocate VMs (t)
for each server s marked "OVER_COMMITTED" do
    find server s_l with sufficient free capacity;
    if found then
        choose VMs to migrate and move them to s_l;
    else
        power on new server;
        choose VMs to migrate and move them to s_l;
    end if;
end for;
for each server s marked "UNDER_COMMITTED" do
    find group servers where all VMs from s can be moved;
    verify that the move will be beneficial in long term;
    if move is beneficial then move VMs
end for;
```

TABLE VIII

Pseudo-code for the physical server assessment step (as executed at time t) for computing shares.

```
proceudre ComputeShares(t)
for each physical server s and each resource r do
    for VH h hosted on s do
        fairShare_h^r(t) = totalLoad_{s,h}^r(t) / totalServLoad_s^r(t);
    end for;
    for VM h hosted on s do
        for VM i belonging to VH h hosted on s do
            effectiveShare_i(t) = Share_i / totalShares_{s,h}^r(t) fairShare_h^r(t);
        end for;
    end for;
end for;
```

TABLE IX

Pseudo-code for the physical server share and limits enforcement step (as executed at time t).

```
procedure EnforceLimitsAndShares (t)
for each physical server s do
    for VM i hosted on s do
        set effective shares and limits of VM i on s as computed in
            prior steps;
    end for;
end for;
```

The first step (block 202) of the method is computation of allowed resource usage for each virtual machine and resource. Since the usage at time t is limited by the growth rate, the method checks the history of resource usage for a given VM and computes compliant amount matching growth rate parameter $\delta_i^r$ from the VM's SLA. The value is adjusted to guarantee the reservation and enforce the maximum limit.

In the next step (in block 204) of the method, resource limits are computed. Each resource of the virtual hosts is examined, and the total load of all VMs within the virtual hosts is computed. If the load does not exceed the virtual hypervisor's capacity, then no action is required (block 206). If the aggregate load is greater than the capacity, fair resource usage for each of the VMs within the VH is computed based on the VM shares. Note that the shares in this context are the shares within the virtual hypervisor and not the shares enforced at the physical server. Next, all VMs exceeding their share have limits set to the fair value. The VMs which use less resources than the fair share have limits assigned to the current demand plus half of the difference between the current load and fair share. The remaining half is added to the free pool (denoted as $surplus_h^r$). Other allocation strategies may also be employed. Surplus is later distributed among the "greedy" VMs consuming at fair share according to their shares within the virtual hypervisor.

After all of the resource usage limits have been established, the method analyzes physical servers checking if they operate within the predefined utilization boundaries (along all resource dimensions) (block 205). Total guaranteed resource usages for all VMs within the physical server are added as well as the total shares of VMs within each of the VH are computed. The server is marked as "over-utilized", "under-utilized", or "ok" based on whether the guaranteed load (within the optimization horizon) can exceed the server's capacity. Note that aggregates of VMs belonging to the same VH cannot exceed the total capacity of the VH and this constraint is captured in the method. Total shares of VMs of a given VH hosted on the server are used in the next "Compute Shares" method step.

After computing load, limits, and deciding which server is operating outside of optimal utilization range, the system attempts to adjust virtual machine placement (and optionally power on or off physical servers) to bring the servers to optimal utilization in block 209. Pairs of servers are selected which are in over-utilized and under-utilized groups and the virtual machines between them are migrated to bring both servers to optimal operating conditions. If after these operations some servers are still over-utilized, new servers are powered on and VMs migrated to them in block 209. If after balancing, some servers are still under-utilized, the system attempts to consolidate under-utilized servers and power down some of them. Another aspect of the migration decision is where virtual machines should be moved (given a pair of hosts which are out of balance). Note that after the reallocation, servers are analyzed again (block 210) to recompute the load variables, the VM shares are computed based on relative fraction of server's capacity devoted to each of the hosted virtual hypervisors as well as based on relative shares of VMs within the VH in block 212. The system requests shares and limits to be adjusted on the underlying virtualized infrastructure according to computed values in block 214.

Decision for Reallocation of Virtual Machines: The decision to migrate a virtual machine between two physical servers has significant potential to improve system performance by balancing load between physical servers as well as permitting for consolidation of the workload on a smaller number of physical servers during the periods of lower aggregate demand. However, live migration of VMs causes significant expense in terms of network bandwidth and CPU usage needed to transfer the state of VM between source and target host. Therefore, if executed too often based transient workload changes, VM migrations may actually lead to significant performance degradation and also to higher resource consumption. The reason is that if the load conditions triggering the migration are not likely to last for at least an amount of time that justifies amortized cost of virtual machine migration then the VM should not be migrated.

This decision problem is present in several aspects of the problem being solved: 1) in deciding which of the VMs on the overloaded host should be migrated and to which host; 2) when deciding to consolidate under-utilized servers, a high degree of confidence is needed that the load is likely to remain low for a period of time justifying powering down a server. Our prior work in this area can be used to quantify (based on the historical properties of VM workload) as well as properties of the virtualization infrastructure (such as migration time and cost) what is the expected benefit of a particular migration decision.

Having described preferred embodiments of a system and method for fair and economical resource partitioning using virtual hypervisor (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for allocating resources in a cloud environment, comprising:
   determining permitted usage for each of a plurality of virtual machines;
   partitioning resources and virtual machines between network servers in accordance with a virtual hypervisor manager generated in accordance with a virtual hypervisor abstraction layer configured as an interface between a solution manager and an interface to a cloud network; and
   specifying resource allocation in the cloud environment using a virtual hypervisor, allowing the solution manager to dynamically control resource allocation decisions while maintaining a cloud manager's role as an ultimate physical resource manager.

2. The method as recited in claim 1, further comprising:
   determining resource usage limits for each virtual machine associated with the virtual hypervisor;
   analyzing the servers through the virtual hypervisor to determine if the virtual machines need to be migrated to keep the servers within operating utilization range; and
   if reallocation of resources is needed, issuing virtual machine migration requests to migrate virtual machines into a new configuration at the virtual hypervisor abstraction level.

3. The method as recited in claim 2, further comprising:
   reanalyzing the servers to determine if the virtual machines need to be further migrated in the new configuration;
   computing shares to be set on resource and virtual machines to enforce balance requirements; and
   adjusting virtual machine shares and limits for all tracked resources according to computed shares.

4. The method as recited in claim 3, further comprising executing the method for analysis and resource adjustment iteratively employing a tunable step size.

5. The method as recited in claim 2, wherein determining resource usage limits includes determining a capacity of the virtual hypervisor.

6. The method as recited in claim 1, wherein determining permitted usage includes determining permitted usage based upon service level agreements.

7. The method as recited in claim 1, wherein the virtual hypervisor abstraction layer generates an application programming interface to manage the resources and virtual machines.

8. The method as recited in claim 1, wherein the cloud network includes a cloud manager for mapping virtual machines to physical servers in accordance with constraints defined by at least one virtual hypervisor, wherein the constraints defined includes a minimum guaranteed rate of growth of a resource for a virtual machine.

9. The method as recited in claim 1, wherein the virtual hypervisor is requested from the cloud network.

10. The method as recited in claim 1, wherein the virtual hypervisor includes abstract groupings of resources which are managed by a cloud manager of the cloud network with respect to a service level agreement between the cloud manager of the cloud network and the solution manager.

11. The method as recited in claim 1, wherein deployment and management of the virtual machines on top of the virtual hypervisor is handled by the solution manager.

12. A non-transitory computer readable storage medium comprising a computer readable program for allocating resources in a cloud environment, wherein the computer readable program when executed on a computer causes the computer to perform the steps of:
   determining permitted usage for each of a plurality of virtual machines;
   partitioning resources and virtual machines between network servers in accordance with a virtual hypervisor manager generated in accordance with a virtual hypervisor abstraction layer configured as an interface between a solution manager and an interface to a cloud network; and
   specifying resource allocation in the cloud environment using a virtual hypervisor, allowing the solution manager to dynamically control resource allocation decisions while maintaining a cloud manager's role as an ultimate physical resource manager.

13. The computer readable storage medium as recited in claim 12, further comprising:
   determining resource usage limits for each virtual machine associated with the virtual hypervisor;
   analyzing the servers through the virtual hypervisor to determine if the virtual machines need to be migrated to keep the servers within operating utilization range; and if reallocation of resources is needed, issuing virtual machine migration requests to migrate virtual machines into a new configuration at the virtual hypervisor abstraction level.

14. The computer readable storage medium as recited in claim 13, further comprising:
reanalyzing the servers to determine if the virtual machines need to be further migrated in the new configuration;
computing shares to be set on resource and virtual machines to enforce balance requirements; and
adjusting virtual machine shares and limits for all tracked resources according to computed shares.

15. The computer readable storage medium as recited in claim 14, further comprising executing the method for analysis and resource adjustment iteratively employing a tunable step size.

16. The computer readable storage medium as recited in claim 13, wherein determining resource usage limits includes determining a capacity of the virtual hypervisor.

17. The computer readable storage medium as recited in claim 12, wherein determining permitted usage includes determining permitted usage based upon service level agreements.

18. The computer readable storage medium as recited in claim 12, wherein the virtual hypervisor abstraction layer generates an application programming interface to manage the resources and virtual machines.

19. The computer readable storage medium as recited in claim 12, wherein the cloud network includes a cloud manager for mapping virtual machines to physical servers in accordance with constraints defined by at least one virtual hypervisor, wherein the constraints defined include a minimum guaranteed rate of growth of a resource for a virtual machine.

20. The computer readable storage medium as recited in claim 12, wherein the virtual hypervisor is requested from the cloud network.

21. The computer readable storage medium as recited in claim 12, wherein the virtual hypervisor includes abstract groupings of resources which are managed by a cloud manager of the cloud network with respect to a service level agreement between the cloud manager of the cloud network and the solution manager.

22. The computer readable storage medium as recited in claim 12, wherein deployment and management of the virtual machines on top of the virtual hypervisor is handled by the solution manager.

23. A system for allocating resources in a cloud environment, comprising:
a solution manager configured to deploy and manage virtual machines;
a cloud network managed by a cloud manager and including at least on physical server configured to employ the virtual machines;
at least one virtual hypervisor including abstract groupings of resources which are managed by the cloud manager with respect to a service level agreement between the cloud manager of the cloud network and the solution manager, wherein the cloud manager maps the virtual machines to the at least one physical server in accordance with constraints defined by the at least one virtual hypervisor and the virtual machines handled by the solution manager are abstracted on top of the at least one virtual hypervisor such that resources are efficiently and fairly allocated within the cloud network; and
the solution manager configured to dynamically control resource allocation decisions within the cloud environment while maintaining a cloud manager's role as an ultimate physical resource manager.

24. The system as recited in claim 23, further comprising a virtual hypervisor application programming interface configured to manage the resources and virtual machines by providing an interface between a cloud application programming interface and the solution manager.

25. The system as recited in claim 24, further comprising physical hypervisors associated with physical servers wherein the virtual hypervisor application programming interface provides a user with application programming interfaces of the physical hypervisor without exposing the details of particular hypervisor software or upon which physical server the hypervisor runs.

* * * * *